(12) United States Patent
Takasu et al.

(10) Patent No.: US 9,754,249 B2
(45) Date of Patent: Sep. 5, 2017

(54) DATA PROCESSING APPARATUS, POS SYSTEM AND CONTROL METHOD OF THE POS SYSTEM

(71) Applicant: Seiko Epson Corporation, Shinjuku-ku, Tokyo (JP)

(72) Inventors: Kazuhiro Takasu, Suwa (JP); Koichiro Tsutsumi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1007 days.

(21) Appl. No.: 13/930,418

(22) Filed: Jun. 28, 2013

(65) Prior Publication Data

US 2014/0006189 A1 Jan. 2, 2014

(30) Foreign Application Priority Data

Jun. 28, 2012 (JP) .................................. 2012-145678
Jun. 29, 2012 (JP) .................................. 2012-146528

(51) Int. Cl.
| | |
|---|---|
| *G06Q 20/20* | (2012.01) |
| *G07G 1/00* | (2006.01) |
| *G07G 1/14* | (2006.01) |
| *G06Q 20/32* | (2012.01) |

(52) U.S. Cl.
CPC ......... *G06Q 20/204* (2013.01); *G06Q 20/202* (2013.01); *G06Q 20/3274* (2013.01); *G07G 1/0045* (2013.01); *G07G 1/0081* (2013.01); *G07G 1/14* (2013.01)

(58) Field of Classification Search
None
See application file for complete search history.

(56) References Cited

U.S. PATENT DOCUMENTS

| | | | |
|---|---|---|---|
| 6,783,071 B2 * | 8/2004 | Levine | G06K 17/0022 235/375 |
| 7,389,934 B2 | 6/2008 | Do et al. | |
| 7,913,912 B2 | 3/2011 | Do et al. | |
| 2006/0256371 A1 | 11/2006 | King et al. | |
| 2008/0082423 A1 * | 4/2008 | Iida | G06Q 20/20 705/17 |

FOREIGN PATENT DOCUMENTS

| | | |
|---|---|---|
| CN | 201203910 Y | 3/2009 |
| CN | 201570093 U | 9/2010 |
| JP | 05-073769 A | 3/1993 |
| JP | 2004-126763 A | 4/2004 |
| JP | 2007-133743 A | 5/2007 |

(Continued)

*Primary Examiner* — F. Zeender
*Assistant Examiner* — Denisse Ortiz Roman
(74) *Attorney, Agent, or Firm* — Kilpatrick Townsend & Stockton LLP

(57) ABSTRACT

A data processing apparatus includes a first interface to which a device which reads data is connected, a second interface to which a terminal apparatus is connected, an identification information transmission unit that transmits identification information to the terminal apparatus, and a control unit that when the data read by the device is input to the first interface, determines an association of the device and the terminal apparatus based on a correspondence of the read data and the identification information transmitted to the terminal apparatus.

8 Claims, 6 Drawing Sheets

(56) References Cited

FOREIGN PATENT DOCUMENTS

| | | |
|---|---|---|
| JP | 2008-250884 A | 10/2008 |
| JP | 2008-269186 A | 11/2008 |
| JP | 2008-542861 A | 11/2008 |
| JP | 2010-262414 A | 11/2010 |
| JP | 2011-138285 A | 7/2011 |
| WO | 2012-009596 A2 | 1/2012 |

* cited by examiner

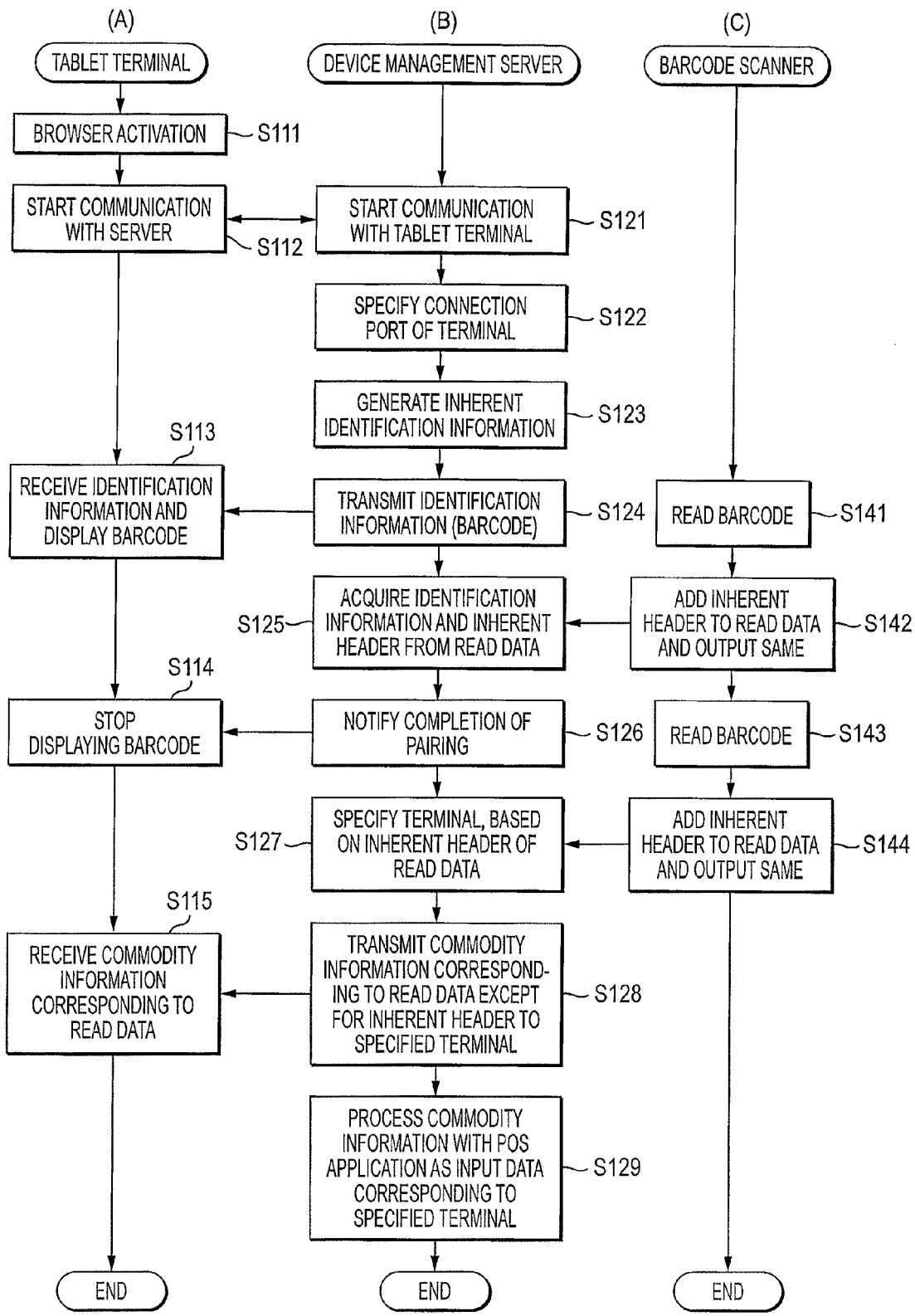

DATA PROCESSING APPARATUS, POS SYSTEM AND CONTROL METHOD OF THE POS SYSTEM

The disclosure of Japanese Patent Application Nos. 2012-145678 filed on Jun. 28, 2012 and 2012-146528 filed on Jun. 29, 2012, including specifications, drawings and claims are incorporated herein by reference in its entirety.

BACKGROUND

1. Technical Field

The disclosure relates to a data processing apparatus that processes transaction information, a Point of Sales (POS) system and a control method of the POS system.

2. Related Art

A POS system has been known which has a reading apparatus (barcode scanner or barcode reader) reading a barcode and the like so as to perform transaction relating to a commodity sale (for example, refer to JP-A-5-073769). In the system, a barcode attached on a commodity is optically read by an apparatus connected to a POS terminal and processing is performed based on the read data.

Also, regarding the above system, an example has been known in which a plurality of the apparatuses reading the barcode and the like is used and the data read by the respective apparatuses is transmitted to a POS register and the like to thus perform account processing (for example, refer to JP-A-2011-138285). Particularly, in the system disclosed in JP-A-2011-138285, a handy terminal reads a barcode and wirelessly transmits the read data to any one of a plurality of POS registers. In the system, each handy terminal reads a communication address indicating a transmission destination of the data and transmits the read data to a designated POS register.

In the system of JP-A-2011-138285, the handy terminal that reads the barcode should have a function of selecting and performing communication with a transmission destination of the data, in addition to the function of reading the barcode. That is, when establishing a POS system having a plurality of reading apparatuses reading the information such as barcode, it is not possible to use the simple reading apparatus such as disclosed in JP-A-5-073769. Therefore, a plurality of apparatuses having a control function is included in the POS system, so that a configuration of the system is complicated and it is necessary to manage functions and software settings of the respective apparatuses. Also, it is not easy to implement a configuration having a plurality of reading apparatuses.

SUMMARY

According to the disclosure, the data processing apparatus to which the data reading device and the terminal apparatus are connected transmits the identification information to the terminal apparatus and can easily determine the association of the device and the terminal apparatus, based on the correspondence of the identification information and the read data read by the device.

By associating the connection port to which the device is connected and the terminal apparatus, it is possible to specify the device and to associate the same with the terminal apparatus without providing the device with a special function or configuration. By storing the association of the connection port of the device and the terminal apparatus, whenever the read data is input from the device.

Since the read data input from the device is processed by the POS application program as the transaction information of the terminal apparatus associated with the device.

Since a result of the processing in which the barcode information input from the device is processed as data of a commodity to be sold with the terminal apparatus associated with the corresponding device is transmitted to the terminal apparatus.

That is, the data processing apparatus of the disclosure has the first interface that is connected to the device reading the data and outputting the read data and additional data, the second interface that is connected to the terminal apparatus, the identification information transmission unit that transmits the identification information to the terminal apparatus and the control unit that, when the read data and additional data output from the device are input to the first interface, compares the information included in the input read data with the identification information transmitted to the terminal apparatus and determines the association of the device having output the additional data and the terminal apparatus to which the identification information is transmitted.

The data processing apparatus of the disclosure include a storage unit that associates and stores therein the additional data of the device and terminal information identifying the terminal apparatus to which the identification information is transmitted in accordance with the association determined by the control unit.

Also, the data processing apparatus of the disclosure includes the POS application execution unit that executes the POS application program processing the transaction information. The device reads and outputs the transaction information, and when the transaction information output from the device is input to the first interface, the POS application execution unit may process the transaction information as information corresponding to the terminal apparatus in accordance with the association determined by the control unit.

Also, in the data processing apparatus of the disclosure, the device is a barcode scanner that reads a barcode and outputs read data of the barcode, the transaction information is barcode information relating to the commodity sale read by the barcode scanner, and when the barcode information output from the barcode scanner is input, the POS application execution unit may process the barcode information as data of the barcode processed in the terminal apparatus in accordance with the association determined by the control unit.

Also, in the data processing apparatus of the disclosure, the POS application execution unit may transmit a result of the processing in which the data of the barcode processed in the terminal apparatus is processed to the terminal apparatus.

According to the disclosure, in the POS system where the data reading device and the terminal apparatus are connected to the data processing apparatus, the data processing apparatus transmits the identification information to the terminal apparatus. Based on the correspondence of the identification information and the read data read by the device, the data processing apparatus can easily determine the association of the device and the terminal apparatus. According to the disclosure, the data processing apparatus transmits the identification information to the terminal apparatus and can determine the association of the device and the terminal apparatus more easily, based on the correspondence of the terminal information transmitted based on the identification information and the read data read by the device.

According to the disclosure, the read data that is obtained as the device reads the barcode is processed by the POS application program as the transaction information of the terminal apparatus associated with the device.

Also, in the POS system of the disclosure, the device may add additional data to the read data and then transmit the same, the data processing apparatus may include an execution unit that executes a POS application processing the transaction information, and when the read data and the additional data are received at the first interface, the control unit of the data processing apparatus may compare the information included in the read data and the identification information transmitted to the terminal apparatus to thus determine the association of the device and the terminal apparatus to which the identification information is transmitted.

According to the disclosure, in the POS system, the data processing apparatus transmits the identification information to the terminal apparatus. The identification information is received and displayed by the terminal apparatus. Based on the identification information included in the read data that is output as the device reads the displayed identification information.

According to the disclosure, in the POS system, the identification information transmitted from the data processing apparatus to the terminal apparatus is displayed and read by the device, and the read data and the additional data are output from the device.

BRIEF DESCRIPTION OF THE DRAWINGS

FIG. 8 is a flowchart showing operations of the control system in the second illustrative embodiment.

DESCRIPTION OF EXEMPLARY EMBODIMENTS

Hereinafter, illustrative embodiments of the disclosure will be described with reference to the drawings.

First Illustrative Embodiment

Figure 1:
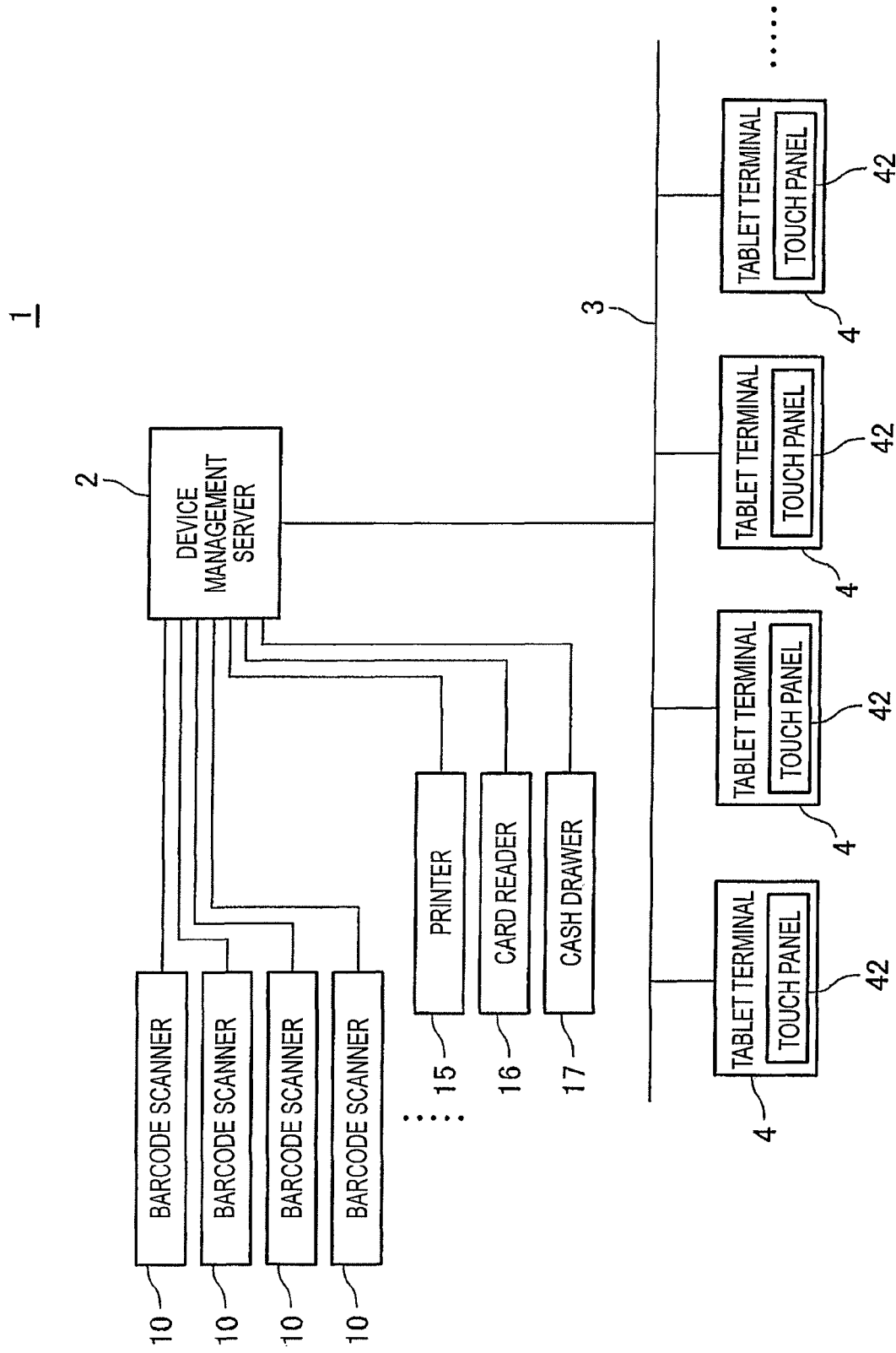
FIG. 1 shows a schematic configuration of a control system according to a first illustrative embodiment.

FIG. 1 shows a schematic configuration of a control system 1 according to an illustrative embodiment to which the disclosure is applied.

The control system 1 shown in FIG. 1 is an aspect of a so-called POS system that is used for a retail store such as shopping center and department store or for other various stores. A main function of the control system 1 is to manage selling, stock and sales situations and the like of commodities in a store. Also, the control system has functions of performing an account corresponding to a commodity bought by a customer, issuing a receipt in correspondence to payment made by the customer and the like on a register counter L provided in the store.

The control system 1 is configured by connecting a device management server 2 (data processing apparatus) and a plurality of tablet terminals 4 (terminal apparatus) through a network 3 in data-communication with each other. Each tablet terminal 4 is a tablet-type (plate-shaped) computer and has a display panel that displays an image and a touch panel 42 in which a touch sensor detecting a touch operation is integrated.

The control system 1 executes account processing as the POS system, based on data that is input as the tablet terminal 4 is operated, and transmits and displays a processing result to and on the tablet terminal 4. That is, each tablet terminal 4 functions as a POS terminal by an operation of an operator and the device management server 2 executes the account processing such as calculation of a total amount, so that the control system 1 entirely implements functions of the POS system.

The device management server 2 is connected with a plurality of barcode scanners 10 (device). The barcode scanner 10 is an apparatus that optically reads a barcode and outputs read data. The barcode that can be read by the barcode scanner 10 may be a JAN code, an EAN, a UPC, an ITF code, a CODE39, a CODE128, an NW-7, a QR code (registered trademark) and the like and can be appropriately selected in correspondence to utilities of the control system 1. While a power supply is on, the barcode scanner 10 executes a reading operation at a predetermined period. When detecting the barcode, the barcode scanner outputs the read data to the device management server 2. In the meantime, a configuration is shown in FIG. 1 where the barcode scanners 10 having the same number as that of the tablet terminals 4 are provided. However, the numbers of the tablet terminals 4 and the barcode scanners 10 may be different and the numbers of the barcode scanners 10 and the tablet terminals 4 of the control system 1 are arbitrary.

Also, the device management server 2 is connected with a printer 15, a card reader 16 and a cash drawer 17. The printer 15 is a dot impact printer that performs a printing operation on a roll sheet, an inkjet printer, a thermal printer that performs a printing operation on a heat-sensitive roll sheet, or the like. The printer 15 prints a result of the processing relating to the commodity sale, which is executed by the device management server 2, on the roll sheet and outputs a receipt, in response to control of the device management server 2. The card reader 16 magnetically reads information that is recorded in a magnetic card-type recording medium such as credit card and membership card, and outputs the read data to the device management server 2. The cash drawer 17 holds therein cash and opens a cash holding part in response to a control signal input from the device management server 2.

The network 3 is a communication line connecting the device management server 2 and the tablet terminal 4 in communication with each other, and is configured by a wired LAN based on an Ethernet (registered trademark) standard or wireless LAN based on an IEEE802.11 standard, for example. The network 3 may be connected to a public switched telephone network or IP line network or implemented as a part of the wide area communication line.

Figure 2:
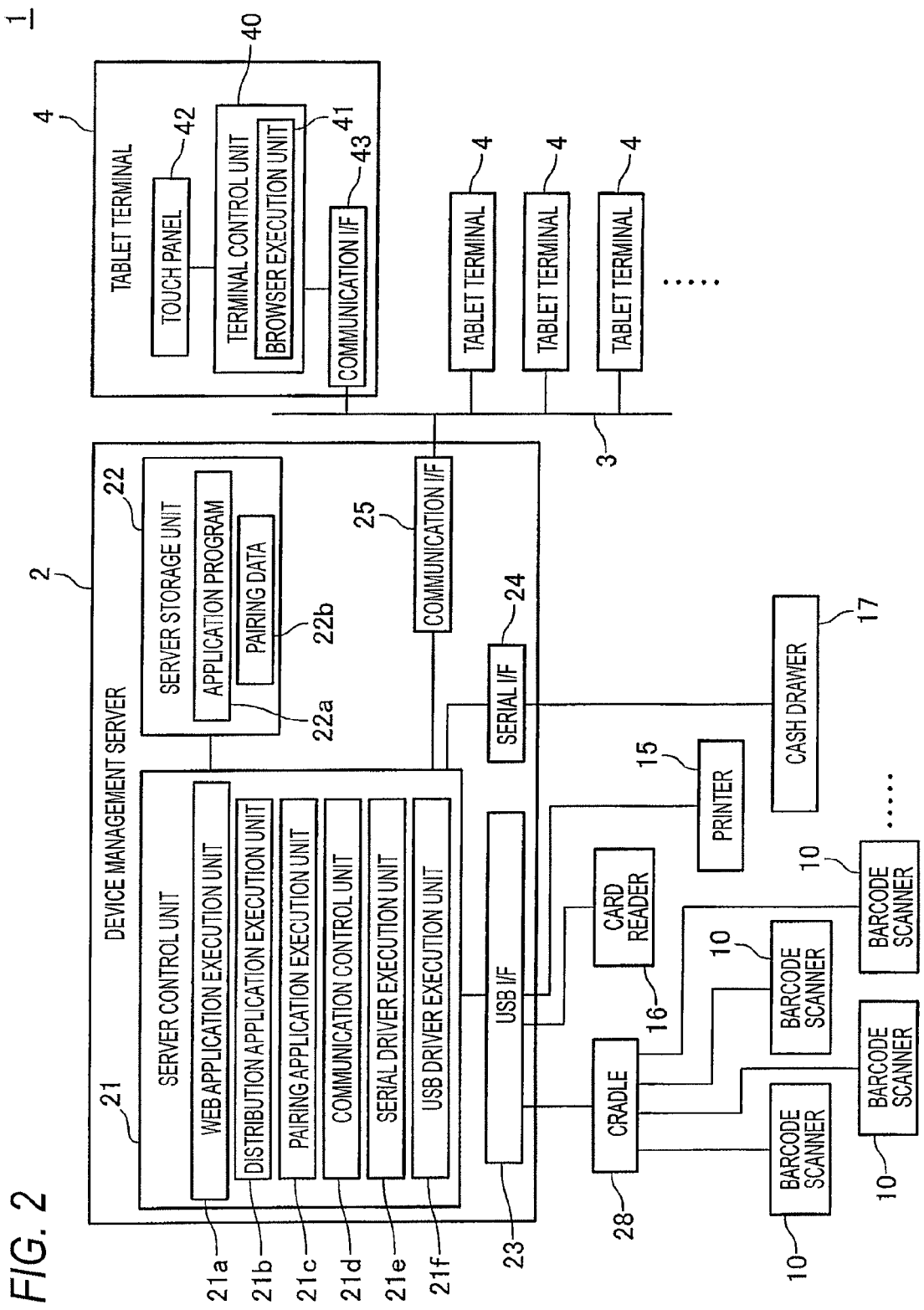
FIG. 2 is a block diagram showing functional configurations of the control system.

FIG. 2 is a block diagram showing functional configurations of the device management server 2 and the tablet terminal 4.

The device management server 2 has, as an interface that is connected to an external apparatus, a USB interface 23, a serial interface 24 and a communication interface 25.

The USB interface 23 is a wired connection interface based on a USB (Universal Serial Bus) standard. The USB interface 23 is connected with the printer 15 and the card reader 16. The printer 15 and the card reader 16 perform serial data communication with the device management server 2, based on the USB standard.

Also, the USB interface 23 is connected with a cradle 28. The cradle 28 is connected to the USB interface 23 through a USB cable and performs serial data communication with the device management server 2 based on the USB standard and wireless communication with the barcode scanner 10.

In this illustrative embodiment, the barcode scanner 10 performs wireless communication based on a Bluetooth (registered trademark) standard and wirelessly transmits the read data, which is obtained by reading the barcode. Whenever reading the barcode, the barcode scanner 10 transmits the read data to a device that has been paired in advance, and is paired with the cradle 28 in this illustrative embodiment. The cradle 28 is paired with the plurality of barcode scanners 10 (four barcode scanners in FIG. 2) and outputs the data, which is input from the respective barcode scanners 10, to the device management server 2. That is, the cradle 28 functions as a relay apparatus that connects the plurality of barcode scanners 10 performing the Bluetooth communication to the device management server 2 by cable.

The USB interface 23 (first interface) has a plurality of USB ports. The printer 15, the card reader 16 and the cradle 28 are respectively connected to the different USB ports. The USB ports to which the respective apparatuses are connected are managed by a USB driver execution unit 21f. When the USB driver execution unit 21f transmits and receives data to and from any one of the printer 15, the card reader 16 and the cradle 28, it distinguishes the respective apparatuses by the USB ports through which the data is input and output.

Furthermore, the device management server 2 has a function of allotting USB ports, which are logically (virtually) provided, to the respective barcode scanners 10 connected to the cradle 28. That is, the device management server 2 has the logical USB ports (logical ports) in addition to the physical USB ports actually provided to the USB interface 23. Then, the device management server 2 allots different USB ports (logical ports) to the respective barcode scanners 10 connected to the cradle 28. Thereby, the respective barcode scanners 10 can be distinguished, based on the connected USB ports.

Also, the serial interface 24 is connected with the cash drawer 17. The serial interface 24 is an interface that performs serial data communication based on an RS-232C standard, for example, and is connected to the cash drawer 17 through a serial cable. The serial interface 24 outputs a control signal to the cash drawer 17 through the serial cable under control of a server control unit 21. By the control signal, a drawer of the cash drawer 17 is opened.

The communication interface 25 (second interface) is connected to the network 3 and transmits and receives data and the like, which are processed by the server control unit 21, to and from the tablet terminals 4 through the network 3.

In the meantime, the device management server 2 may have a local wireless communication interface such as Bluetooth, Wireless USB, UWB, Zigbee and the like, in addition to the above-described interfaces. In this case, the barcode scanner 10, the printer 15, the card reader 16 and the cash drawer 17 may be configured to perform wireless communication with the device management server 2 or may be connected to the device management server by cable.

In the meantime, the tablet terminal 4 has a terminal control unit 30 that controls respective units of the tablet terminal 4 and a touch panel 42. Also, the tablet terminal 4 has a communication interface 43 that is connected to the network 3 and transmits and receives a variety of data to and from the device management server 2 through the network 3. Although all the tablet terminals 4 performing the processing together with the device management server 2 have the respective functional blocks, the functional blocks are shown for one tablet terminal 4 in FIG. 2.

The terminal control unit 40 detects an operation of an operator on the touch panel 42 to thus execute a variety of processing and displays an execution result and the like on the touch panel 42. The terminal control unit 40 operates as a POS terminal by a function of a browser execution unit 41, in response to the operation on the touch panel 42.

The browser execution unit 41 executes a protocol such as HTTP and requests a webpage for POS operation from the device management server 2. When data of the webpage is transmitted from the device management server 2 in response to the request, the browser execution unit downloads and executes the webpage. The browser execution unit 41 displays a screen for a POS terminal on the touch panel 42, based on the webpage data. Also, when a script operating a POS application program is included in the webpage, the browser execution unit 41 executes the script. Thereby, the browser execution unit 41 transmits the data, which is input by the operation on the touch panel 41, to the device management server 2 and displays the data transmitted from the device management server 2 on the touch panel 42.

The device management server 2 configures databases by functions of the server control unit 21 and a server storage unit 22. That is, the device management server 2 configures a database that stores therein information about commodities, a database that manages the sales, a database that manages the stock, and the like, and manages the overall control system 1 by using the databases.

The server control unit 21 (control unit) controls the respective units of the device management server 2 and has a CPU, a ROM, a RAM and a variety of peripheral circuits. Also, the server storage unit 22 has a magnetic recording medium or non-volatile storage apparatus using a semiconductor memory device and stores therein various data so that the data can be re-written.

The server storage unit 22 (storage unit) stores therein a variety of application programs 22a that are executed by the server control unit 21 and paring data 22b. The application programs 22a include various application programs such as a web application program, a distribution application program, a pairing application program and the like that are executed by the server control unit 21.

Also, the pairing data 22b is information that associates each of the barcode scanners 10 and each of the tablet terminals 4. In this illustrative embodiment, each barcode scanner 10 is allotted as an input device corresponding to any one tablet terminal 4. Therefore, when a barcode attached to the commodity is read by the barcode scanner 10 connected to the device management server 2, a commodity code of the read barcode is processed as input data to the corresponding tablet terminal 4. That is, each barcode scanner 10 functions as a barcode scanner for the tablet terminal 4.

Figure 3:
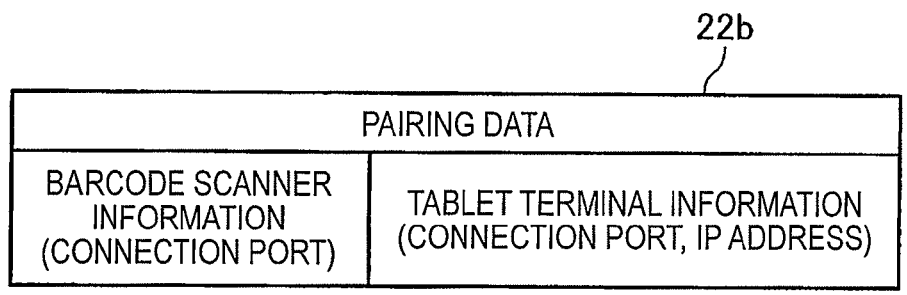
FIG. 3 pictorially shows a configuration example of paring data in the first illustrative embodiment.

FIG. 3 pictorially shows a configuration example of the paring data 22b.

In the example shown in FIG. 3, barcode scanner information (device identification information) that is information specifying the barcode scanner 10 and tablet terminal information (terminal information) that is information specifying the tablet terminal 4 are stored with being associated. The barcode scanner information includes data indicating the USB ports to which the respective barcode scanners 10 are connected. Also, the tablet terminal information may include a port (TCP/IP port number) through which the tablet terminal 4 accesses the device management server 2 and an IP address of the tablet terminal 4. This example is an example where the device management server 2 and the tablet terminal 4 perform communication based on the TCP/IP, and the tablet terminal information may be any information insomuch as it can specify each of the tablet terminals 4 connected in communication with the device management server 2. Also, the barcode scanner information may include data indicating a device name of the barcode scanner 10, a sequence connected to the device management server 2 and the like, in addition to the data indicating the USB ports.

Turning to FIG. 2, the server control unit 21 functions as a web application execution unit 21a, a distribution application execution unit 21b, a pairing application execution unit 21c, a communication control unit 21d, a serial driver execution unit 21e and a USB driver execution unit 21f. The server control unit 21 executes predetermined programs, so that functions of the respective units are implemented.

The web application execution unit 21a reads and executes a web application program that is stored as the application program 22a in the server storage unit 22, and executes a variety of processing as the POS system, as described below. Here, the web application execution unit 21a functions as a POS application execution unit.

Specifically, the web application execution unit 21a generates data of a webpage, which includes a script executing a web application, and transmits the same to the tablet terminal 4 through the communication interface 25 by the function of the communication control unit 21d that will be described later. When the webpage is executed by the tablet terminal 4 and the tablet terminal 4 requests execution of a web application program, the web application execution unit 21a executes processing relating to the commodity sale in response to the request. For example, the web application execution unit 21a reads out data, which indicates a commodity name and a unit price, from the commodity database (not shown) stored in the server storage unit 22, based on the commodity code transmitted by the tablet terminal 4, and transmits the same to the tablet terminal 4. Also, when the tablet terminal 4 transmits data including a commodity code and a quantity of the commodity to be sold, the web application execution unit 21a calculates a total amount, based on the data, and transmits data of the total amount to the tablet terminal 4. Also, when the tablet terminal 4 transmits data of a received amount of money, the web application execution unit 21a calculates an amount of change money. Then, the web application execution unit 21a transmits data of the amount of change money to the tablet terminal 4 and enables the printer 15 to print a receipt including the name and quantity of the sold commodity, the total amount, the amount of change money, the store name and the like. Also, the web application execution unit 21a registers the name and quantity of the sold commodity, the total amount and the like with the sale managing database.

The web application execution unit 21a executes the above processing for each of the tablet terminals 4 connected through the network 3. The web application execution unit 21a can distinguish the respective tablet terminals 4 and individually executes the processing relating to the commodity sale, which is being executed based on the data transmitted and received to and from the tablet terminals 4, for each of the tablet terminals 4.

Also, when the data is input from the barcode scanner 10 while the web application execution unit 21a transmits and receives the data to and from the tablet terminal 4, the web application execution unit 21a processes the input data. Specifically, when the barcode scanner 10 reads the barcode attached on a package of the commodity and the read data is thus input through the USB interface 23, the web application execution unit 21a identifies the input barcode. When the web application execution unit 21a identifies that the input barcode is the commodity code, the web application execution unit 21a transmits the commodity code to the tablet terminal 4 together with the commodity name and the unit price, which are read out from the commodity database (not shown) based on the commodity code.

During the execution of the webpage transmitted by the device management server 2, a browser execution unit 41 of the tablet terminal 4 displays the commodity code, the commodity name, the unit price and the like transmitted from the device management server 2 on the touch panel 42. When a sales quantity is input by the operation on the touch panel 42, the browser execution unit 41 transmits the input sales quantity to the device management server 2 together with the commodity code or commodity name. When the data of the total amount is transmitted from the device management server 2, the browser execution unit 41 displays the total amount on the touch panel 42, based on the data. Also, when a received amount of money from a customer is input by the operation on the touch panel 42, the browser execution unit 41 transmits data of the input received amount of money to the device management server 2. After that, the browser execution unit 41 displays the amount of change money, based on the data transmitted from the device management server 2.

In the meantime, the data of the commodity name, the commodity code, the total amount, the amount of change money and the like, which is transmitted to the tablet terminal 4 by the web application execution unit 21a, may be transmitted with a data format for embedding, which is displayed with being embedded in the webpage being displayed by the browser execution unit 41. Also, the data may be transmitted as data of a webpage for screen display including the data.

The pairing application execution unit 21c (identification information transmission unit) executes a paring application program that is stored as the application program 22a in the server storage unit 22, and performs pairing processing. In the pairing processing, the pairing application execution unit 21c determines an association of the barcode scanner 10 connected through the cradle 28 and the tablet terminal 4. Also, the pairing application execution unit 21c generates and stores pairing data 22b in the server storage unit 22 in accordance with the determined association.

The distribution application execution unit 21b executes a distribution application program that is stored as the application program 22a in the server storage unit 22. The distribution application execution unit 21b performs read data distribution processing of specifying and distributing the tablet terminal 4 corresponding to the data input from the barcode scanner 10 through the USB interface 23, as regards the corresponding data.

Figure 4A:
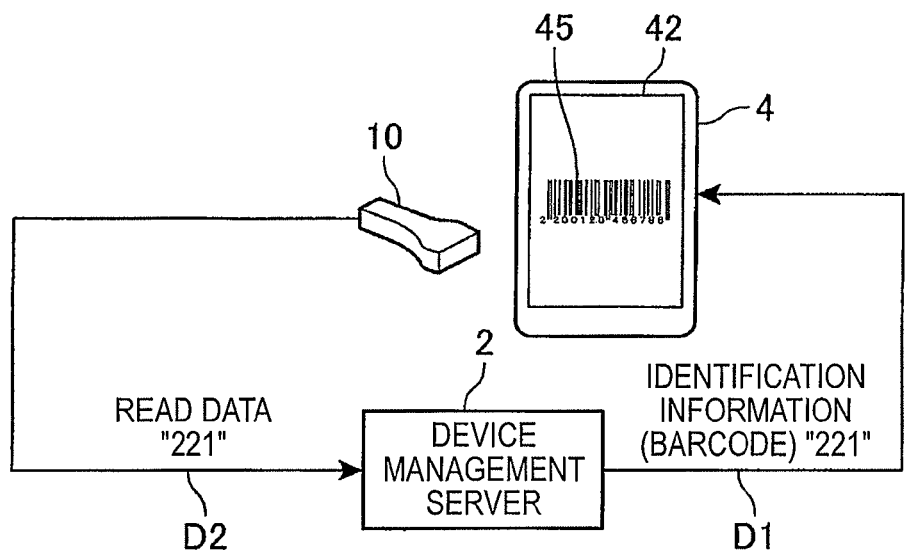
FIGS. 4A and 4B illustrate paring processing and read data distribution processing in the first illustrative embodiment.
Figure 4B:
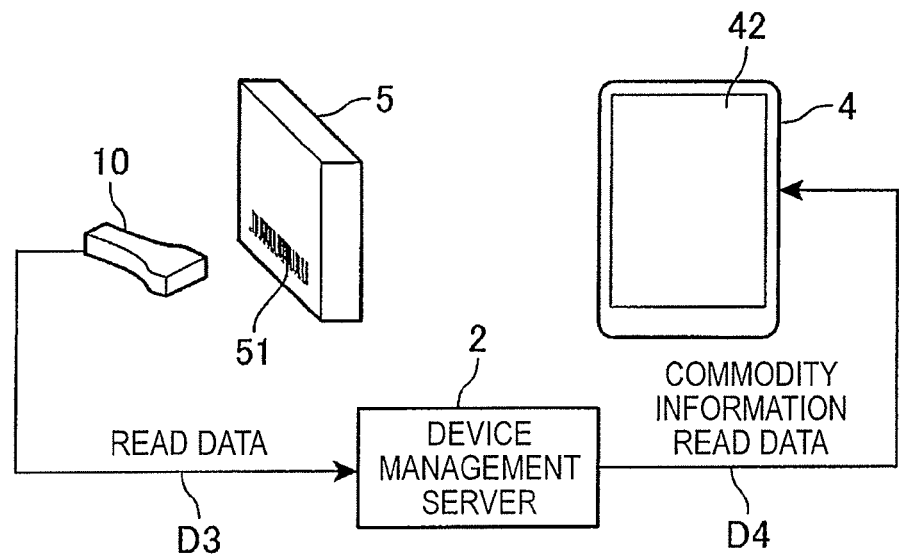

FIGS. 4A and 4B illustrate the operations of the control system 1, in which FIG. 4A shows the paring processing and FIG. 4B shows the read data distribution processing.

In the pairing processing, the pairing application execution unit 21c selects any one tablet terminal 4 and allots identification information to the selected tablet terminal 4. The identification information is information that is generated based on a random number or port number (for example, TCP/IP port number) through which the tablet terminal 4 accesses the device management server 2. The identification information may identify at least the tablet terminals 4 that can be connected to the device management server 2 at the same time. However, the identification information becomes different information whenever the pairing application execution unit 21c issues the identification information. Also, the same identification information is never issued for the plurality of tablet terminals 4.

The pairing application execution unit 21c allots the identification information to each of the tablet terminals 4 and transmits data D1 relating to the respective identification information to the tablet terminals 4. FIG. 4A shows an example where the identification information '221' of three digits is transmitted as the data D1. In the meantime, the data D1 may be the identification information, barcode data expressing each of the identification information as a barcode or data of a barcode font. Here, the pairing application execution unit 21c may transmit the data D1 to all the tablet terminals 4 or allot an identification number to a part of the tablet terminals 4 and transmit the data D1.

When the tablet terminal 4 receives the data D1, it displays a barcode 45 of the received data D1 on the touch panel 42. The barcode 45 is a barcode having a format that can be read by the barcode scanner 10.

Here, the operator reads the barcode 45 by the barcode scanner 10 associated with the tablet terminal 4 that is displaying the barcode 45. Then, the barcode scanner 10 outputs the read data obtained by reading the barcode 45 to the device management server 2. In the example of FIG. 4A, the read data is input to the device management server 2, as data D2 of the barcode scanner 10.

When the data D2 is input from the barcode scanner 10, the pairing application execution unit 21c specifies a USB port to which the data D2 is input. Also, the pairing application execution unit 21c compares the data D2 with the data D1 and determines whether they coincide with each other. When the pairing application execution unit 21c transmits the data D1 to the plurality of tablet terminals 4 at the same time, the pairing application execution unit 21c can compare the plurality of the data D1 with the data D2 to thus specify which data D1 the data D2 corresponds to. The pairing application execution unit 21c associates the tablet terminal information of the tablet terminal 4 of a transmission destination to which the data D1 is transmitted and the USB port to which the data D2 is input and registers the same with the pairing data 22b.

Also, in the read data distribution processing, the distribution application execution unit 21b acquires the read data, which is input from the plurality of barcode scanners 10 connected to the cradle 28, and specifies the USB port to which the read data is input.

In an example of FIG. 4B, the barcode scanner 10 reads a barcode 51 printed or adhered on a commodity 5, and the read data is output to the device management server 2, as data D3. The distribution application execution unit 21b compares a USB port to which the data D3 is input with the barcode scanner information stored in the pairing data 22b. Here, when there is the matched barcode scanner information, the distribution application execution unit 21b acquires the matched barcode scanner information, i.e., the tablet terminal information that is stored in the paring data 22b in association with the USB port. The distribution application execution unit 21b outputs the read data included in the data D3 to the web application execution unit 21a together with the tablet terminal information acquired from the server storage unit 22. Thereby, when any one of the barcode scanners 10 reads the commodity barcode 51, the data of the read commodity barcode 51 is input to the web application execution unit 21a, as the input data of the corresponding tablet terminal 4.

The web application execution unit 21a refers to a commodity information database (not shown), based on the input commodity barcode 51, and transmits data D4 including the commodity information (commodity name, unit price and the like) corresponding to the commodity barcode 51 to the tablet terminal 4.

Also, the web application execution unit 21a functions as a transmission control unit and may transmit the read data itself, which is acquired from the data D3 by the distribution application execution unit 21b, to the tablet terminal 4, as the data D4.

Turning to FIG. 2, the communication control unit 21d controls the communication interface 25. The communication control unit 21d receives the variety of the data transmitted from the tablet terminal 4 and outputs the same to the web application execution unit 21a. Also, the communication control unit 21d transmits the data that is output by the web application execution unit 21a to the tablet terminal 4.

The serial driver execution unit 21e functions as a device driver that controls the cash drawer 17 connected through the serial interface 24. The web application execution unit 21a transmits the data of the amount of change money to the tablet terminal 4 and outputs data instructing the cash drawer 17 to be opened. The serial driver execution unit 21e outputs a control signal to the cash drawer 17 in response to the data.

Also, the USB driver execution unit 21f functions as a device driver that controls a device connected through the USB interface 23.

The USB driver execution unit 21f allots logical USB ports of the device management server 2 to the respective barcode scanners 10 connected to the cradle 28. That is, whenever the barcode scanner 10 is connected to the cradle 28, the USB driver execution unit 21f allots a USB port (logical port) to the connected barcode scanner 10. The USB port that is allotted here is different from the USB port of the USB interface 23 to which the cradle 28 is connected. The USB driver execution unit 21f recognizes the respective barcode scanners 10 by the connected USB ports. When any one barcode scanner 10 outputs the read data to the cradle 28, the USB driver execution unit 21f recognizes the USB port to which the read data is input. Then, the USB driver execution unit 21f outputs the data indicating the recognized USB port and the input read data to the web application execution unit 21a, the distribution application execution unit 21b or pairing application execution unit 21c. Also, the USB driver execution unit 21f converts the data, which is output by the web application execution unit 21a, the pairing application execution unit 21c and the like, into packets based on the USB protocol and outputs the packets to the printer 15, the card reader 16 or the cradle 28.

Figure 5:
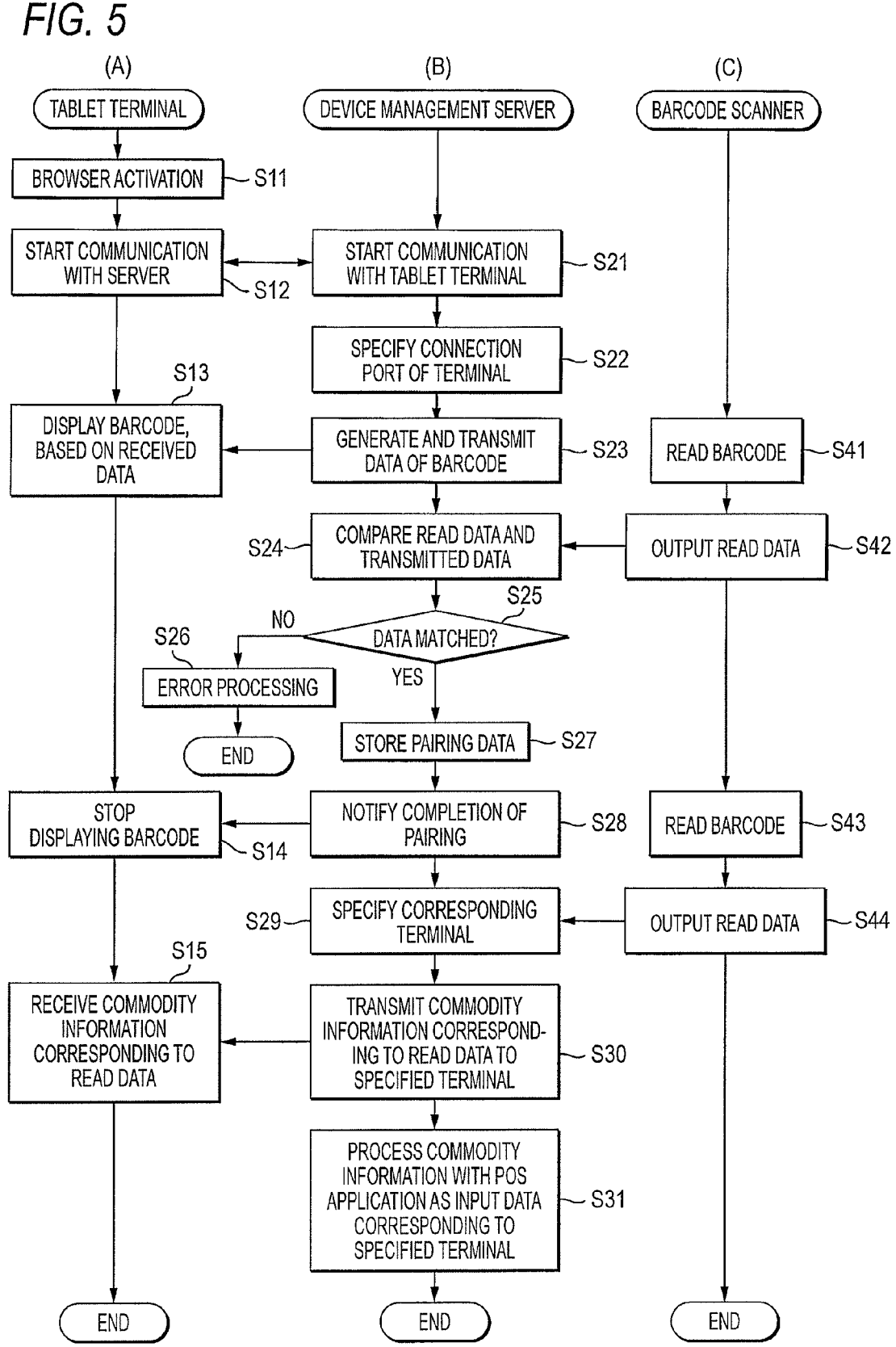
FIG. 5 is a flowchart showing operations of the control system in the first illustrative embodiment.

FIG. 5 is a flowchart showing operations of the control system 1. In FIG. 5, (A) shows operations of the tablet terminal 4, (B) shows operations of the device management server 2 and (C) shows operations of the barcode scanner 10.

First, the browser execution unit 41 of the tablet terminal 4 starts an operation to thus activate the browser and displays a browser start screen on the touch panel 42 (step S11). The browser execution unit 41 controls the communication interface 42 to thus start data communication with the device management server 2 (step S12). The web application execution unit 21a of the device management server 2 starts the communication in response to a request from the tablet terminal 4 (step S21) and specifies a connection port of the tablet terminal 4 (step S22).

Here, the pairing application execution unit 21c starts the pairing processing. The pairing application execution unit 21c generates identification information for the tablet terminal 4 having started the communication (step S23) and transmits data of the generated identification information to the tablet terminal 4 (step S24). The data of the identification information that is transmitted by the pairing application execution unit 21c is a character code of a barcode font expressing the data of the identification information and the identification information with a barcode or image data of a barcode of the identification information.

The browser execution unit 41 displays the barcode on the touch panel 42, based on the data of the identification information transmitted from the device management server 2 (step S13).

When an operator confirms that the barcode is displayed on the touch panel 42, the operator reads the barcode displayed on the touch panel 42 by the barcode scanner 10 that is used in association with the tablet terminal 4. When the barcode scanner 10 reads the barcode (step S41), the barcode scanner 10 outputs the read data to the device management server 2 through the cradle 28 (step S42).

The pairing application execution unit 21c specifies the USB port to which the read data is input and compares the read data input from the barcode scanner 10 with the identification information generated in step S23 (step S25). Here, when the identification information does not coincide with contents of the read data (step S25: No), the pairing application execution unit 21c outputs an error (step S26) and ends this processing. In step S26, the error may be notified to the tablet terminal 4. Also, the pairing application execution unit 21c may destroy the acquired read data and return to step S24 without outputting the error.

On the other hand, when the identification information coincides with contents of the read data (step S25: Yes), the pairing application execution unit 21c generates the barcode scanner information from the USB port to which the read data is input, generates the tablet terminal information of the tablet terminal 4 of the transmission destination from which the identification information has been transmitted in step S23 and generates the pairing data 22b (step S27). After that, the pairing application execution unit 21c notifies the tablet terminal 4 that the pairing processing is completed (step S28). When the browser execution unit 41 receives the notification transmitted from the device management server 2, it stops (erases) the display of the barcode on the touch panel 42 (step S14). Thereby, the pairing processing is completed.

After that, when the barcode scanner 10 reads the barcode of the commodity (step S43) and outputs the read data thereof to the device management server 2 (step S44), the distribution application execution unit 21b of the device management server 2 specifies the USB port to which the read data is input and refers to the pairing data 22b based on the specified USB port to thus specify the tablet terminal 4 corresponding to the read data (step S29). The distribution application execution unit 21b transmits the commodity information corresponding to the read data to the specified tablet terminal 4 (step S30), outputs the commodity information corresponding to the read data to the web application execution unit 21a as the input data corresponding to the specified terminal and processes the same by the POS application (step S31).

Also, when the commodity information corresponding to the read data of the barcode is transmitted from the device management server 2, the tablet terminal 4 receives the data and processes the same (step S15).

As described above, the control system 1 of the illustrative embodiment to which the disclosure is applied has the device management server 2. The device management server 2 has the USB interface 23 that is connected to the barcode scanner 10 reading the data, the communication interface 25 that is connected to the tablet terminal 4, the identification information transmission unit that transmits the identification information to the tablet terminal 4 and the server control unit 21 that, when the read data read by the barcode scanner 10 is input to the first interface, determines the association of the barcode scanner 10 and the tablet terminal 4, based on the read data and the identification information transmitted to the tablet terminal 4. Thereby, it is possible to easily determine the association of the barcode scanner 10 and the tablet terminal 4 by the device management server 2. Also, it is not necessary to provide the barcode scanner 10 with the function of identifying or selecting the tablet terminals 4, so that it is possible to use the simple barcode scanner 10 having fewer functions.

Also, when the configuration is adopted in which the device management server 2 is connected to the plurality of the tablet terminals 4 and the plurality of the barcode scanners 10, it is possible to determine the association of each tablet terminal 4 and barcode scanner 10, based on the correspondences of the identification information transmitted to the plurality of the tablet terminals 4 and the read data read by the plurality of the barcode scanners 10. Thereby, it is possible to easily establish the system where the read data of the barcode scanners is processed in the tablet terminals 4.

Also, the USB interface 23 has a first connection port and a second connection port. When the read data, which is read by the barcode scanner 10 connected to the first connection port, is input, the server control unit 21 determines the association of the first connection port to which the read data is input and the tablet terminal 4. Hence, it is possible to associate the connection port to which the barcode scanner 10 is connected and the tablet terminal 4 each other, thereby specifying the barcode scanner 10 to thus associate the same with the tablet terminal 4 without providing a special function or configuration to the barcode scanner 10. Hence, like the control system 1 of this illustrative embodiment, it is possible to easily implement a system that reads barcodes of commodities to be sold by the plurality of the barcode scanners 10 and performs the processing relating to the commodity sale by the plurality of the tablet terminals 4.

Also, the device management server 2 has the server storage unit 22 that stores therein the association of the first connection port determined by the server control unit 21 and the tablet terminal 4, and stores the association of the connection port of the barcode scanner 10 and the tablet terminal 4, so that whenever the read data is input from the barcode scanner 10, the device management server 2 can easily specify the tablet terminal 4 corresponding to the barcode scanner 10.

Also, when the transaction information read by the barcode scanner 10 is input to the USB interface 23, the web application execution unit 21a, which executes the POS application program processing the transaction information read by the barcode scanner 10, executes the processing with associating the transaction information with the tablet terminal 4 in accordance with the association determined in the server control unit 21. Hence, it is possible to effectively perform the account processing as the POS system by using the data read with the barcode scanner 10.

Also, the web application execution unit 21a processes the barcode information, which is input from the barcode scanner 10, as the data of the commodity that is sold with the tablet terminal 4 corresponding to the barcode scanner 10, and transmits a result of the processing to the tablet terminal 4. Hence, it is possible to execute the processing relating to the commodity sale in the tablet terminal 4, based on the result of the processing.

Also, when the read data, which is obtained by reading the barcode relating to the commodity sale, is input from the barcode scanner 10, the server control unit 21 may enable the web application execution unit 21a to process the read data as the data of the barcode, which is processed as sold in the tablet terminal 4, in accordance with the association determined by the pairing application execution unit 21c. Also, it is possible to easily implement a system that reads the barcodes of the commodities to be sold by the plurality of the barcode scanners 10 and performs the processing relating to the commodity sale by the plurality of the tablet terminals 4.

Also, the web application execution unit 21a transmits a result of the processing, in which the read data input from the barcode scanner 10 is processed as the data of the barcode processed as sold in the tablet terminal 4, to the tablet terminal 4, and the tablet terminal 4 displays the processing result on the touch panel 42 by the function of the browser execution unit 41. Hence, it is possible to easily implement a system that reads the barcodes of the commodities to be sold by the plurality of the barcode scanners 10 and performs the processing relating to the commodity sale by the POS application of the device management server 2. Also, whenever the read data is input from the barcode scanner 10, the web application execution unit 21a transmits the read data to the corresponding tablet terminal 4 in accordance with the association determined by the pairing application execution unit 21c. Therefore, it is possible to easily implement a system that reads the barcodes of the commodities to be sold by the plurality of the barcode scanners 10 and performs the processing relating to the commodity sale by the plurality of the tablet terminals 4.

Also, in the control system 1, the tablet terminal 4 downloads the webpage from the device management server 2 and the browser execution unit 41 displays an operation screen and the like of the POS terminal, as the browser screen. Also, the browser execution unit 41 executes the script of the downloaded webpage to thus function as the POS system by using the functions of the web application execution unit 21a. Thus, it is not necessary to mount the so-called POS application in the tablet terminal 4. By this configuration, it is possible to maintain the identity of the application that is executed by each tablet terminal 4. Also, when updating a version of the application, for example, it is not necessary to perform the version-up operation for each tablet terminal 4, so that the maintenance is improved. Also, since it is not necessary to mount a special function in the tablet terminal 4 and to connect a special external device to the tablet terminal 4, it is possible to use the tablet terminal 4 of a universal product in which at least the browser is installed.

In the above configuration, since it is possible to input the commodity code as the transaction information of the tablet terminal 4 by using the barcode scanner 10 connected to the device management server 2, it is possible to use the tablet terminal 4 as the POS terminal without connecting the barcode scanner 10 to the tablet terminal 4. Also, in this illustrative embodiment, since a receipt is printed by the printer 15 connected to the device management server 2, it is possible to issue a receipt without connecting the printer 5 to each tablet terminal 4. The same effects are also obtained as regards the using the card reader 16 and cash drawer 17 connected to the device management server 2.

Second Illustrative Embodiment

In the below, the control system 1 according to a second illustrative embodiment to which the disclosure is applied is described with reference to FIGS. 6 to 8. Meanwhile, in the second illustrative embodiment, the same parts as those of the first illustrative embodiment are denoted with the same reference numerals and the illustration and descriptions thereof are omitted.

In the second illustrative embodiment, each of the barcode scanners 10 has an inherent header (additional data) embedded therein. The header is a code having a predetermined length that is non-volatilely stored in the ROM (not shown) of the barcode scanner 10. As described above, when the barcode scanner 10 reads the data of the barcode and outputs the read data to the cradle 28, it adds the embedded header to a head of the read data and then outputs the same. That is, the barcode scanners 10 add the headers, which are embedded in the respective barcode scanners 10, to the read data and then output the same. Also, the cradle 28 outputs the read data, which is input from the barcode scanner 10, to the USB interface 23 together with the header added by the barcode scanner 10.

The device management server 2 can specify the barcode scanner 10 having output the read data by the header added to the read data of the barcode scanner 10, which is input through the USB interface 23.

Figure 6:
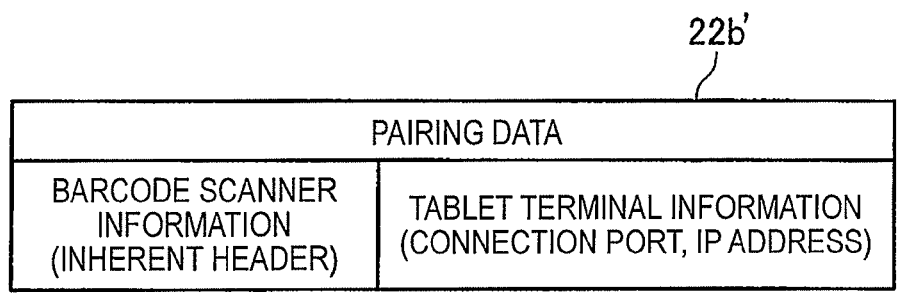
FIG. 6 pictorially shows a configuration example of paring data in a second illustrative embodiment.

FIG. 6 pictorially shows a configuration example of paring data 22b' in the second illustrative embodiment.

The server storage unit 22 (storage unit) stores therein pairing data 22b' together with the various application programs 22a that are executed by the server control unit 21.

The pairing data 22b' is stored in the server storage unit 22 instead of the pairing data 22b of the first illustrative embodiment. The pairing data 22b' is information that associates the header of each barcode scanner 10 connected to the device management server 2 and the tablet terminal 4. Each barcode scanner 10 is allotted as an input device corresponding to any one tablet terminal 4. Hence, when the barcode attached on a package of the commodity is read by the barcode scanner 10 connected to the device management server 2, the commodity code of the read barcode is processed as the input data to the corresponding tablet terminal 4. That is, each barcode scanner 10 functions as a barcode scanner for the tablet terminal 4. The pairing data 22b' associates the header, which is embedded in each barcode scanner 10, with the tablet terminal 4 so as to associate the barcode scanner 10 and the tablet terminal 4.

In the example shown in FIG. 6, the barcode scanner information as the inherent header, which is the information specifying the barcode scanner 10, and the tablet terminal information (terminal information) that is the information specifying the tablet terminal 4 are stored with being associated each other. In the barcode scanner information, the inherent header of the barcode scanner 10 is stored, as described above. Also, as the tablet terminal information, the port (TCP/IP port number) through which the tablet terminal 4 accesses the device management server 2 and the IP address of the tablet terminal 4 may be exemplified. This example is an example where the device management server 2 and the tablet terminal 4 perform communication, based on the TCP/IP. Regarding the tablet terminal information, any information may be used insomuch as it can specify each of the tablet terminals 4 connected in communication with the device management server 2.

Also, the server control unit 21 executes a predetermined program to thus function as the web application execution unit 21a, the distribution application execution unit 21b, the pairing application execution unit 21c, the communication control unit 21d, the serial driver execution unit 21e and the USB driver execution unit 21f. The web application execution unit 21a reads out and executes the web application program, which is stored as the application program 22a in the server storage unit 22, and executes a variety of processing as the POS system, as described below. Here, the web application execution unit 21a functions as the POS application execution unit.

The functions and operations of the respective units are the same as those of the first illustrative embodiment, except for the distribution application execution unit 21b and the pairing application execution unit 21c.

The pairing application execution unit 21c (identification information transmission unit) executes the pairing application program, which is stored as the application program 22a in the server storage unit 22, thereby performing the pairing processing. In the pairing processing, the pairing application execution unit 21c determines the association of the barcode scanners 10 connected through the cradle 28 and the tablet terminals 4 and generates and stores the pairing data 22b' in the server storage unit 22 in accordance with the determined association.

The distribution application execution unit 21b executes the distribution application program, which is stored as the application program 22a in the server storage unit 22, and performs the read data distribution processing of specifying and distributing the tablet terminal 4 corresponding to the data input from the barcode scanner 10 through the USB interface 23, as regards the corresponding data.

Figure 7A:
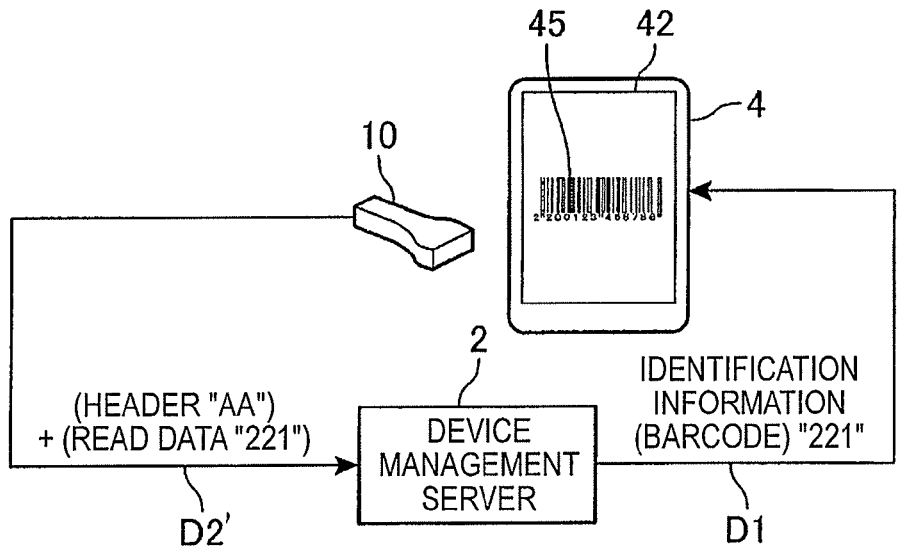
FIGS. 7A and 7B illustrate paring processing and read data distribution processing in the second illustrative embodiment.
Figure 7B:
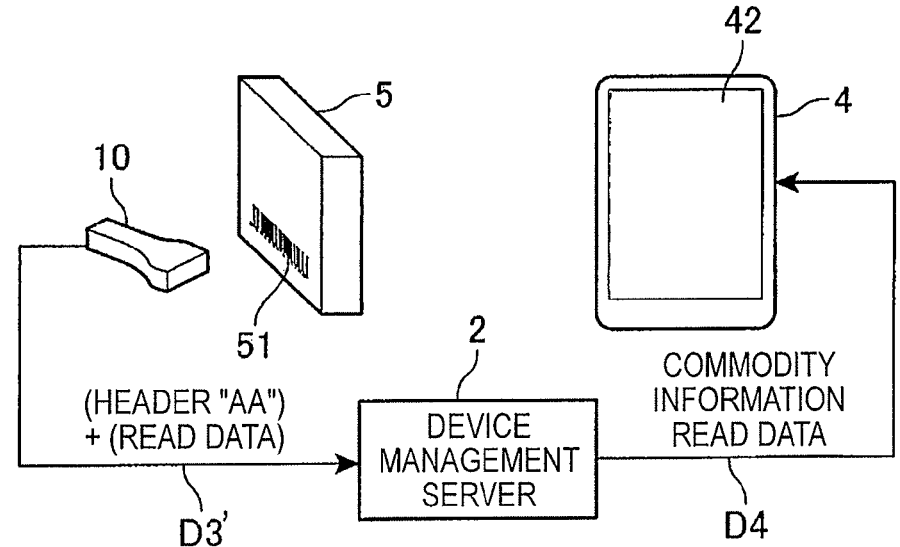

FIGS. 7A and 7B illustrate operations of the control system 1 in the second illustrative embodiment, in which FIG. 7A shows the pairing processing and FIG. 7B shows the read data distribution processing.

In the pairing processing, the pairing application execution unit 21c selects any one tablet terminal 4 and allots identification information to the selected tablet terminal 4. The identification information is information that is generated based on a random number or port number (for example, TCP/IP port number) through which the tablet terminal 4 accesses the device management server 2. The identification information may identify at least the tablet terminals 4 that can be connected to the device management server 2 at the same time and may not be the inherent information of the tablet terminal 4. That is, it is sufficient if the plurality of tablet terminals 4 is not provided with the same identification information at the same time.

The pairing application execution unit 21c allots the identification information to each of the tablet terminals 4 and transmits data D1 relating to the respective identification information to the tablet terminals 4. FIG. 7A shows an example where the identification information '221' of three digits is transmitted as the data D1. In the meantime, the data D1 may be the identification information, barcode data expressing each of the identification information as a barcode or data of a barcode font. Here, the pairing application execution unit 21c may transmit the data D1 to all the tablet terminals 4 or allot an identification number to only a part of the tablet terminals 4 and transmit the data D1.

When the tablet terminal 4 receives the data D1, it displays the barcode 45 of the received data D1 on the touch panel 42. The barcode 45 is a barcode having a format that can be read by the barcode scanner 10.

Here, the operator reads the barcode 45 by the barcode scanner 10 associated with the tablet terminal 4 that is displaying the barcode 45. Then, the barcode scanner 10 outputs data D2', which is obtained by adding the inherent header to the read data obtained by reading the barcode 45, to the device management server 2. In the example of FIG. 7A, the data D2' including a header 'AA' of the barcode scanner 10 is input to the device management server 2.

The pairing application execution unit 21c separates the data D2', which is input from the barcode scanner 10, into the header and the read data. For example, the pairing application execution unit 21c extracts a part matching the data D1 from the data D2', and can extract the remaining data as the header when there is the matching part. When the pairing application execution unit 21c transmits the data D1 to the plurality of the tablet terminals 4 at the same time, the pairing application execution unit 21c can compare the plurality of the data D1 with the data D2' to thus specify which data D1 the data D2' corresponds to. The pairing application execution unit 21c associates the tablet terminal information of the tablet terminal 4 of a transmission destination to which the data D1 is transmitted and the header extracted from the data D2' and registers the same with the pairing data 22b'.

Also, in the read data distribution processing, the distribution application execution unit 21b acquires the read data, which is input from the plurality of barcode scanners 10 connected to the cradle 28, and extracts the header added to the read data.

In an example of FIG. 7B, the barcode scanner 10 reads the barcode 51 printed or adhered on the commodity 5, and the header 'AA' is added to the read data, which is then output to the device management server 2, as data D3'. The distribution application execution unit 21b compares a head part of the data D3' with the existing header stored in the pairing data 22b'. Here, when there is the matched header, the distribution application execution unit 21b acquires the tablet terminal information that is stored in the paring data 22b' in association with the matched header. The distribution application execution unit 21b removes the header from the data D3' to thus acquire the read data and outputs the acquired read data to the web application execution unit 21a as the read data corresponding to the removed header. Thereby, when any one of the barcode scanners 10 reads the commodity barcode 51, the data of the read commodity barcode 51 is input to the web application execution unit 21a, as the input data of the corresponding tablet terminal 4.

The web application execution unit 21a refers to the commodity information database (not shown), based on the input commodity barcode 51, and transmits data D4 including the commodity information (commodity name, unit price and the like) corresponding to the commodity barcode 51 to the tablet terminal 4.

Also, the web application execution unit 21a functions as a transmission control unit and may transmit the read data itself, which is extracted from the data D3' by the distribution application execution unit 21b, to the tablet terminal 4, as the data D4. In this configuration, since the distribution application execution unit 21b removes the header from the data D4, the read data and the data indicating the tablet terminal 4 corresponding to the read data are input to the web application execution unit 21a and the header is not input. Therefore, the web application execution unit 21a doesn't have to execute the processing relating to the header.

Also, the USB driver execution unit 21*f* acquires the data, which is input from the respective devices through the USB interface 23, and outputs the same to the web application execution unit 21*a*, the distribution application execution unit 21*b*, the pairing application execution unit 21*c* and the like. Also, the USB driver execution unit 21*f* converts the data, which is output from the web application execution unit 21*a*, the pairing application execution unit 21*c* and the like, into packets based on the USB protocol and outputs the same to the printer 15, the card reader 16 or the cradle 28.

FIG. 8 is a flowchart showing operations of the control system 1 in the second illustrative embodiment. In FIG. 8, (A) shows operations of the tablet terminal 4, (B) shows operations of the device management server 2 and (C) shows operations of the barcode scanner 10.

First, the browser execution unit 41 of the tablet terminal 4 starts an operation to thus activate the browser and displays a browser start screen on the touch panel 42 (step S111). The browser execution unit 41 controls the communication interface 43 to thereby start data communication with the device management server 2 (step S112). The web application execution unit 21*a* of the device management server 2 starts the communication in response to a request from the tablet terminal 4 (step S121) and specifies a connection port of the tablet terminal 4 (step S122).

Here, the pairing application execution unit 21*c* starts the pairing processing. The pairing application execution unit 21*c* generates identification information for the tablet terminal 4 having started the communication (step S123) and transmits data of the generated identification information to the tablet terminal 4 (step S124). The data of the identification information that is transmitted by the pairing application execution unit 21*c* is a character code of a barcode font expressing the data of the identification information and the identification information with a barcode or image data of a barcode of the identification information.

The browser execution unit 41 displays the barcode on the touch panel 42, based on the data of the identification information transmitted from the device management server 2 (step S113).

When the operator confirms that the barcode is displayed on the touch panel 42, the operator reads the barcode displayed on the touch panel 42 by the barcode scanner 10 that is used in association with the tablet terminal 4. When the barcode scanner 10 reads the barcode (step S141), the barcode scanner 10 adds the inherent header to the read data and outputs the same to the device management server 2 through the cradle 28 (step S142).

The pairing application execution unit 21*c* acquires the identification information and inherent data from the data input from the barcode scanner 10 and generates the pairing data 22*b*' (step S125). After that, the pairing application execution unit 21*c* notifies the tablet terminal 4 that the pairing processing is completed (step S126). When the browser execution unit 41 receives the notification transmitted from the device management server 2, it stops (erases) the display of the barcode on the touch panel 42 (step S114). Thereby, the pairing processing is completed.

After that, when the barcode scanner 10 reads the barcode of the commodity (step S143), adds the header to the read data and outputs the same to the device management server 2 (step S144), the distribution application execution unit 21*b* of the device management server 2 refers to the pairing data 22*b*', based on the header included in the data input from the barcode scanner 10, and thus specifies the tablet terminal 4 corresponding to the read data (step S127). The distribution application execution unit 21*b* transmits the commodity information corresponding to the read data except for the header to the specified tablet terminal 4 (step S128), outputs the commodity information corresponding to the read data to the web application execution unit 21*a* as the input data corresponding to the specified terminal and processes the same by the POS application (step S129).

Also, when the commodity information corresponding to the read data of the barcode is transmitted from the device management server 2, the tablet terminal 4 receives the data and processes the same (step S115).

As described above, according to the control system 1 of the second illustrative embodiment to which the disclosure is applied, the device management server 2 has the communication interface 25 that is connected to the tablet terminal 4, the USB interface 23 that is connected to the barcode scanner 10 reading the data and outputting the read data and the header, the pairing application execution unit 21*c* that transmits the identification information to the tablet terminal 4 and the server control unit 21 that, when the read data and header output from the barcode scanner 10 is input to the USB interface 23, compares the information included in the input read data and the identification information transmitted to the tablet terminal 4 and thus determines the association of the barcode scanner 10 having output the header and the tablet terminal 4 to which the identification information is transmitted. Thereby, it is possible to easily determine the association of the barcode scanner 10 and the tablet terminal 4, based on the association of the identification information transmitted to the tablet terminal 4 and the read data read by the barcode scanner 10. Also, it is not necessary to provide the barcode scanner 10 with the function of identifying or selecting the tablet terminals 4, so that it is possible to use the simple barcode scanner 10 having fewer functions. Also, it is possible to easily establish a system where the read data read by the barcode scanners is processed in the tablet terminals 4.

Also, the device management server 2 stores, in the server storage unit 22, the pairing data 22*b*' including the inherent header of the barcode scanner 10 and the terminal information identifying the tablet terminal 4 to which the identification information is transmitted, in accordance with the association determined in the server control unit 21. Thereby, whenever the read data is input from the barcode scanner 10, it is possible to easily specify the tablet terminal 4 corresponding to the barcode scanner 10. Also, the device management server 2 can easily distinguish the read data, which is input from the barcode scanner 10, and process the same in association with the corresponding tablet terminal 4.

In the meantime, the respective illustrative embodiments just show aspects of the disclosure and can be arbitrarily modified and applied within the scope of the disclosure.

For example, in the respective illustrative embodiments, the case has been described in which the plurality of the tablet terminals 4 functions as the POS terminals by using the external devices such as the barcode scanners 10, the printer 15, the card reader 16 and cash drawer 17 connected to the device management server 2. However, the disclosure is not limited thereto. For example, the devices may be dispersed and connected to a plurality of the device management servers 2 and the plurality of the tablet terminals 4 may be connected to the plurality of device management servers 2 at any time.

Also, in the respective illustrative embodiments, the case has been described in which the plurality of the barcode scanners 10 has been exemplified as the device reading the data. However, the disclosure is not limited thereto. For example, the disclosure can be also applied to the card reader 16 or other devices such as MICR reader magnetically reading MICR characters formed on a check and the like by printing and the like.

Also, in the respective illustrative embodiments, the case has been described in which when the tablet terminal 4 executes the function as the POS terminal, it accesses the device management server 2 and downloads the webpage. However, the tablet terminal 4 may store the webpage in advance and read and execute the stored webpage in response to a user's operation. Also, in the respective illustrative embodiments, the case has been described in which the control system 1 of the disclosure is applied to the POS system. However, the disclosure is not limited to the POS system. Also, for example, the functional blocks shown in FIGS. 1 and 2 can be arbitrarily implemented by cooperation of hardware and software and do not suggest a specific hardware configuration. Also, the respective devices may be enabled to execute the various operations including the operations of the flowcharts of FIGS. 5 and 8 by executing programs stored in an externally connected storage medium.

According to the disclosure, the data processing apparatus to which the data reading device and the terminal apparatus are connected transmits the identification information to the terminal apparatus and can easily determine the association of the device and the terminal apparatus, based on the correspondence of the identification information and the read data read by the device. Therefore, it is possible to manage the association of the device and the terminal apparatus by a method in which a special device having a function of identifying or selecting the terminal apparatus is not required. Also, for example, it is possible to easily establish a system in which the data read by the device is processed in the terminal apparatus.

By associating the connection port to which the device is connected and the terminal apparatus, it is possible to specify the device and to associate the same with the terminal apparatus without providing the device with a special function or configuration. Thereby, for example, it is possible to easily implement a system that reads barcodes of commodities to be sold by a plurality of devices and performs processing relating to the commodity sale by a plurality of terminal apparatuses.

By storing the association of the connection port of the device and the terminal apparatus, whenever the read data is input from the device, the data processing apparatus can easily specify the terminal apparatus corresponding to the device.

Since the read data input from the device is processed by the POS application program as the transaction information of the terminal apparatus associated with the device, it is possible to effectively perform account processing as a POS system by using the data read by the device.

It is possible to process the barcode information input from the device by the POS application as data of a commodity to be sold with the terminal apparatus associated with the corresponding device.

Since a result of the processing in which the barcode information input from the device is processed as data of a commodity to be sold with the terminal apparatus associated with the corresponding device is transmitted to the terminal apparatus, it is possible to execute the processing relating to the commodity sale in the terminal apparatus, based on the processing result.

That is, the data processing apparatus of the disclosure has the first interface that is connected to the device reading the data and outputting the read data and additional data, the second interface that is connected to the terminal apparatus, the identification information transmission unit that transmits the identification information to the terminal apparatus and the control unit that, when the read data and additional data output from the device are input to the first interface, compares the information included in the input read data with the identification information transmitted to the terminal apparatus and determines the association of the device having output the additional data and the terminal apparatus to which the identification information is transmitted.

According to the data processing apparatus of the disclosure, the data processing apparatus that is connected to the device reading the data and outputting the read data and the terminal apparatus transmits the identification information to the terminal apparatus. Based on the correspondence of the identification information and the read data read by the device, the data processing apparatus can easily determine the association of the device having output the additional data and the terminal apparatus. Also, it is not necessary to provide the device with a function of identifying or selecting a plurality of terminal apparatuses, so that it is possible to use a simple device having fewer functions. Thereby, for example, it is possible to easily establish a system in which data read by the plurality of devices is processed in the plurality of terminal apparatuses.

The data processing apparatus of the disclosure may include a storage unit that associates and stores therein the additional data of the device and terminal information identifying the terminal apparatus to which the identification information is transmitted in accordance with the association determined by the control unit.

Since the inherent additional data, which is output together with the read data by the device, and the terminal information identifying the terminal apparatus are associated and stored, whenever the read data is input from the device, the data processing apparatus can easily specify the terminal apparatus corresponding to the device. Thereby, the data processing apparatus can easily distinguish the read data input from the device and associate and process the same with the corresponding the terminal apparatus.

Also, the data processing apparatus of the disclosure may include the POS application execution unit that executes the POS application program processing the transaction information. The device reads and outputs the transaction information, and when the transaction information output from the device is input to the first interface, the POS application execution unit may process the transaction information as information corresponding to the terminal apparatus in accordance with the association determined by the control unit.

Since the read data input from the device is processed by the POS application as the transaction information of the terminal apparatus corresponding to the device, it is possible to effectively perform the account processing as a POS system by using the device.

Also, in the data processing apparatus of the disclosure, the device is a barcode scanner that reads a barcode and outputs read data of the barcode, the transaction information is barcode information relating to the commodity sale read by the barcode scanner, and when the barcode information output from the barcode scanner is input, the POS application execution unit may process the barcode information as data of the barcode processed in the terminal apparatus in accordance with the association determined by the control unit.

It is possible to process the read data of the barcode, which is input from the device, by the POS application, as the data of the barcode of the commodity to be sold with the terminal apparatus corresponding to the device.

Also, in the data processing apparatus of the disclosure, the POS application execution unit may transmit a result of the processing in which the data of the barcode processed in the terminal apparatus is processed to the terminal apparatus.

Since the processing result of processing the read data of the barcode input from the barcode is transmitted to the terminal apparatus corresponding to the device, the terminal apparatus can execute the processing relating to the commodity sale. Thereby, it is possible to easily implement a system that reads a barcode relating to sale by the device and performs the processing relating to the commodity sale by the POS application of the data processing apparatus.

According to the disclosure, in the POS system where the data reading device and the terminal apparatus are connected to the data processing apparatus, the data processing apparatus transmits the identification information to the terminal apparatus. Based on the correspondence of the identification information and the read data read by the device, the data processing apparatus can easily determine the association of the device and the terminal apparatus. Hence, it is possible to manage the association of the device and the terminal apparatus by a method in which a special device having a function of identifying or selecting the terminal apparatus is not required. Also, it is possible to easily establish a system in which the data read by the device is processed in the terminal apparatus.

According to the disclosure, the data processing apparatus transmits the identification information to the terminal apparatus and can determine the association of the device and the terminal apparatus more easily, based on the correspondence of the terminal information transmitted based on the identification information and the read data read by the device.

According to the disclosure, the read data that is obtained as the device reads the barcode is processed by the POS application program as the transaction information of the terminal apparatus associated with the device. Thus, it is possible to effectively perform the account processing as the POS system by using the read data read by the device.

Also, in the POS system of the disclosure, the device may add additional data to the read data and then transmit the same, the data processing apparatus may include an execution unit that executes a POS application processing the transaction information, and when the read data and the additional data are received at the first interface, the control unit of the data processing apparatus may compare the information included in the read data and the identification information transmitted to the terminal apparatus to thus determine the association of the device and the terminal apparatus to which the identification information is transmitted.

According to the disclosure, the data processing apparatus transmits the identification information to the terminal apparatus and can easily determine the association of the device having output the additional data and the terminal apparatus, based on the correspondence of the identification information and the read data read by the device. Also, it is not necessary to provide the device with a function of identifying or selecting a plurality of terminal apparatuses, so that it is possible to use a simple device having fewer functions. Thereby, for example, it is possible to easily establish a system in which data obtained by the plurality of devices is processed in the plurality of terminal apparatuses.

According to the disclosure, in the POS system, the data processing apparatus transmits the identification information to the terminal apparatus. The identification information is received and displayed by the terminal apparatus. Based on the identification information included in the read data that is output as the device reads the displayed identification information, it is possible to easily determine the association of the terminal apparatus and the device by the data processing apparatus. Therefore, it is possible to manage the association of the device and the terminal apparatus by a method in which a special device having a function of identifying or selecting the terminal apparatus is not required. Also, it is possible to easily establish a system in which the data read by the device is processed in the terminal apparatus.

According to the disclosure, in the POS system, the identification information transmitted from the data processing apparatus to the terminal apparatus is displayed and read by the device, and the read data and the additional data are output from the device. Thereby, the data processing apparatus can easily determine the association of the device having output the additional data and the terminal apparatus, based on the correspondence of the read data, the identification information and the additional data. Also, it is not necessary to provide the device with a function of identifying or selecting a plurality of terminal apparatuses, so that it is possible to use a simple device having fewer functions. Thereby, for example, it is possible to easily establish a system in which data read by the plurality of devices is processed in the plurality of terminal apparatuses.

According to the disclosure, it is possible to implement a system, which processes data read by a device, by a simple configuration.

What is claimed is:

1. A data processing apparatus comprising:
a first interface configured to be connected to a device, wherein the device includes a barcode scanner configured to read data in the form of barcodes;
a second interface configured to be connected to a terminal apparatus, wherein the terminal apparatus includes a display;
an identification information transmission unit which transmits identification information to the terminal apparatus to be displayed on the display; and
a control unit that receives read data, read by the barcode scanner, at the first interface and determines an association of the device and the terminal apparatus based on a correspondence of the read data and the identification information transmitted to the terminal apparatus.

2. The data processing apparatus according to claim 1, wherein the first interface includes a first connection port and a second connection port,
the device is connected to the first connection port, and
wherein when the data read by the device is input to the first connection port, the control unit is configured to determine an association of the first connection port and the terminal apparatus.

3. The data processing apparatus according to claim 2 further comprising:
a storage unit configured to store therein the association of the first connection port and the terminal apparatus, which is determined by the control unit.

4. The data processing apparatus according to claim 1 further comprising:
a POS application execution unit configured to execute a POS application program, wherein the POS application program processes transaction information read by the device, wherein when the transaction information read by the device is input to the first interface, the POS application execution unit associates the transaction information with the terminal apparatus and executes processing in accordance with the association determined in the control unit.

5. The data processing apparatus according to claim 4, wherein the transaction information read by the device is barcode information relating to a commodity sale.

6. The data processing apparatus according to claim 5, wherein the POS application execution unit is configured to processes the barcode information and to transmit a result of the processing of the barcode to the terminal apparatus.

7. The data processing apparatus according to claim 1, wherein the first interface receives additional data from the device, and wherein when the read data and additional data output from the device are input to the first interface, the control unit is configured to compare information included in the data input to the first interface with the identification information transmitted to the terminal apparatus and to determine an association of the device having output the additional data and the terminal apparatus to which the identification information is transmitted.

8. A data processing apparatus comprising:

a first interface configured to be connected to first and second devices, wherein the devices each include barcode scanners configured to read barcodes;

a second interface configured to be connected to a terminal apparatus including a display;

an identification information transmission unit which transmits an identification code to the terminal apparatus to be displayed on the display of the terminal apparatus in the form of a barcode; and a control unit which receives read data from each of the first and second devices, and in response to receiving read data from the first or second device matching the identification code transmitted to the terminal apparatus, determines an association between the device from which the matching read data is received and the terminal apparatus.

* * * * *